(12) United States Patent
Cheng et al.

(10) Patent No.: US 9,959,546 B2
(45) Date of Patent: May 1, 2018

(54) ASSOCIATING FINANCIAL ACCOUNTS WITH A SOCIAL NETWORKING SYSTEM USER PROFILE

(71) Applicant: Facebook, Inc., Menlo Park, CA (US)

(72) Inventors: Loren Alfred Cheng, Mountain View, CA (US); Edward Zagat, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 1099 days.

(21) Appl. No.: 13/747,649

(22) Filed: Jan. 23, 2013

(65) Prior Publication Data

US 2014/0207547 A1    Jul. 24, 2014

(51) Int. Cl.
*G06Q 30/02* (2012.01)
*G06Q 50/00* (2012.01)
*G06Q 40/02* (2012.01)

(52) U.S. Cl.
CPC ......... *G06Q 30/0215* (2013.01); *G06Q 40/02* (2013.01); *G06Q 50/01* (2013.01)

(58) Field of Classification Search
USPC .......................................................... 705/14
See application file for complete search history.

(56) References Cited

U.S. PATENT DOCUMENTS

| | | | |
|---|---|---|---|
| 2001/0053998 A1* | 12/2001 | Kohda et al. | 705/14 |
| 2009/0098821 A1* | 4/2009 | Shinya | 455/3.01 |
| 2010/0241559 A1* | 9/2010 | O'Connor et al. | 705/39 |
| 2011/0053998 A1* | 3/2011 | Raines et al. | 514/400 |
| 2011/0087550 A1* | 4/2011 | Fordyce et al. | 705/14.65 |
| 2011/0145348 A1* | 6/2011 | Benyamin et al. | 709/206 |
| 2012/0011432 A1* | 1/2012 | Strutton | 715/234 |
| 2012/0054205 A1* | 3/2012 | Baluja et al. | 707/749 |
| 2012/0191606 A1* | 7/2012 | Milne | 705/44 |
| 2014/0164199 A1* | 6/2014 | Wilkes | 705/35 |

* cited by examiner

*Primary Examiner* — Sam Refai
*Assistant Examiner* — Alexandru Cirnu
(74) *Attorney, Agent, or Firm* — Fenwick & West LLP (57) ABSTRACT

A social networking system associates a financial account identified by a user with a user profile maintained by the social networking system for the user. The social networking system may compensate the user for associating the financial account with the user profile by crediting the identified financial account by an amount. The credit may be applied to subsequent purchases by the user at a vendor identified by the user. To simplify vendor selection, the social networking system may suggest one or more candidate pages associated with vendors to the user. Information in a transaction history of the financial account and in the user profile may be used to identify the candidate pages, allowing the user to select a vendor with which the user has previously transacted by selecting a candidate page associated with the vendor.

22 Claims, 3 Drawing Sheets

ASSOCIATING FINANCIAL ACCOUNTS WITH A SOCIAL NETWORKING SYSTEM USER PROFILE

BACKGROUND

The present disclosure relates generally to social networking systems and more specifically to linking financial accounts with a user's profile in a social networking system.

Social networking systems, or social utilities that track and enable connections between users (including people, businesses, and other entities), have become prevalent in recent years. In particular, a social networking system allows users to more efficiently communicate information that is relevant to their friends or other connections in the social network. Social networks typically incorporate a system for maintaining connections among users in the social network and links to content that are likely to be relevant to the users. Social networks also collect and maintain information about the users of the social network. This information may be static, such as geographic location, employer, job type, age, music preferences, interests, and a variety of other attributes, or it may be dynamic, such as tracking a user's actions within the social network. This information can then be used to target information delivery so that information more likely to be of particular interest to a user can be communicated to that user.

While a social networking system may capture a wide variety of information about a user, the information is based on interactions within the social networking system or interactions with online entities that share information with the social networking system. However, social networking system users perform a variety of actions outside of the social networking system or with entities that do not share information with the social networking system. For example, social networking system users purchase goods or services from vendors at physical retail locations or using websites associated with the vendors. However, users are currently unable to easily share information about their actions outside of the social networking system, which limits the information available to the social networking system for determining information about the users.

SUMMARY

Social networking system users perform a variety of actions outside of the social networking system, which describe information about the users. For example, a social networking system user purchases products or services from a vendor via a physical retail location associated with the vendor or from a website associated with the vendor. To allow the social networking system to obtain information about the social networking system from these purchases, the social networking system user associates one or more of the user's financial accounts with the user's own user profile in the social networking system. The user may use one or more privacy settings to limit the information from the financial account that is accessible to the social networking system. Information about the user's transactions obtained from the financial account allows the social networking system to improve content provided to the social networking system user based on the transactions.

The social networking system may provide a user with an incentive to associate a financial account with a user profile. For example, the social networking system may provide the user with a credit to a vendor in exchange for the user linking a financial account with the user's user profile, and the user may apply the credit to a subsequent purchase from the vendor. Vendors may be associated with pages or other objects maintained by the social networking system. For example, the social networking system associates a vendor identifier with a page. When a user associates a financial account with the user profile, the social networking system identifies candidate pages associated with vendors based on information in the user profile and/or from transactions in the financial account. The user may specify one or more privacy settings that limit the transactions in the financial account that are accessible to the social networking system.

The one or more candidate pages are presented to the user, who may then select a candidate page. Using the vendor identifier or other suitable information associated with the selected candidate page, the social networking system identifies the vendor associated with the selected candidate page and a credit amount to a financial provider associated with the user's financial account. The credit amount identifies a financial amount that the user receives from the social networking system and/or from the vendor in exchange for associating the financial account with the user's user profile. When the user subsequently makes a purchase from the vendor associated with the selected candidate page using the financial account associated with the user profile, the financial provider applies the credit amount to the purchase. By providing the user with compensation for associating the financial account with the user's user profile, the social networking system increases the likelihood of the user associating the user profile and financial account. This allows the social networking system to use information from the financial account, subject to the user's privacy settings, to obtain additional information about interests and preferences of the user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

The described embodiments enable a user of the social networking system to associate a financial account identifier with his social networking system account, thereby permitting the social networking system access to a history of transactions performed by the user using the financial account. The social networking system can then receive a transaction history of the financial account from the account provider and use the transaction history to recommend social networking system pages associated with vendors of interest to the user. The transaction history includes one or more of a vendor name, vendor address or location, purchase amount, purchase description, purchase date, product identification, and/or other information recorded as part of a transaction conducted using a financial account. A reference to the term "product" is not limited to physical goods but includes various types of goods and services, charity donations, gift cards, memberships of organizations, tickets to events, media including music, videos, movies, etc.

Figure 1:
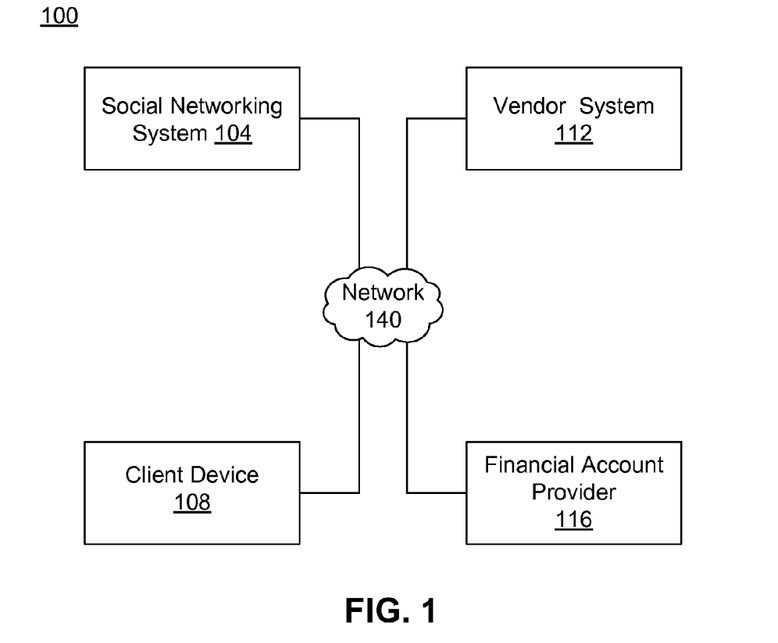
FIG. 1 is a block diagram of a system environment for linking a financial account to a user profile in a social networking system, in accordance with an embodiment of the invention.

FIG. 1 is a block diagram of a system environment 100 for a social networking system 104. The system environment 100 shown in FIG. 1 includes a social networking system 104, a client device 108, a vendor system 112, a financial account provider 116, and a network 140. In other embodiments, the system environment 100 may include different and/or additional components than those shown by FIG. 1.

The social networking system 104, further described below in conjunction with FIG. 2, comprises one or more computing devices storing user profiles associated with users and/or other objects as well as connections between users and other users and/or objects. In use, users join the social networking system 104 and then add connections to other users or objects of the social networking system to which they desire to be connected. As further described below in conjunction with FIG. 2, users of the social networking system 104 may be individuals or entities such as businesses, organizations, universities, manufacturers. The social networking system 104 allows its users to interact with each other as well as with other objects maintained by the social networking system 104. In some embodiments, the social networking system 104 allows users to interact with third-party websites, such as the vendor system 112 and the financial account provider 116.

Based on stored data about users, objects and connections between users and/or objects, the social networking system 104 generates and maintains a "social graph." comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 104 modifies edges connecting the various nodes to reflect the interactions.

A client device 108 is a computing device capable of receiving user input as well as transmitting and/or receiving data via the network 140. In one embodiment, the client device 108 is a conventional computer system, such as a desktop or laptop computer. In another embodiment, the client device 104 may be a device having computer functionality, such as a personal digital assistant (PDA), mobile telephone, smart-phone or similar device. The client device 108 is configured to communicate with the social networking system 104, the vendor system 112 and/or the financial account provider 116 via the network 140. In one embodiment, the client device 108 executes an application allowing a user of the client device 108 to interact with the social networking system 104. For example, the client device 108 executes a browser application to enable interaction between the client device 108 and the social networking system 104 via the network 140. In another embodiment, a client device 108 interacts with the social networking system 104 through an application programming interface (API) that runs on the native operating system of the client device 108, such as iOS® or ANDROID™.

The client devices 108 are configured to communicate via the network 140, which may comprise any combination of local area and/or wide area networks, using both wired and wireless communication systems. In one embodiment, the network 140 uses standard communications technologies and/or protocols. Thus, the network 140 may include links using technologies such as Ethernet, 802.11, worldwide interoperability for microwave access (WiMAX), 3G, 4G, CDMA, digital subscriber line (DSL), etc. Similarly, the networking protocols used on the network 140 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 140 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The vendor system 112 comprises one or more servers providing content associated with a vendor. For example, the vendor system 112 provides web pages describing products and/or services sold by one or more vendors. The vendor system 112 may also perform other functions to allow the vendor to provide products or services in exchange for compensation. Examples of functions provided by the vendor system include maintaining accounts for purchasers, tracking inventory levels, modifying pricing of products or services, obtaining compensation for products or services from the financial account provider 116 and/or other suitable actions. The vendor system 112 communicates with the social networking system 104, the client device 108 and/or the financial account provider 116 via the network 140.

The financial account provider 116 stores and maintains financial accounts associated with one or more users. A unique financial account identifier is associated with each financial account. Examples of financial accounts include a credit card account, a checking account, a savings account, a transactional account or any other suitable type of account that records financial transactions between the financial account provider 116 and a user associated with the account. The financial account provider 116 maintains a transaction history associated with a financial account that identifies debits and credits to the account. In one embodiment, the transaction history of a financial account includes groupings of a vendor identifier, a date and a transaction amount to identify a monetary amount provided to a vendor associated with the vendor identifier.

Social Networking System Architecture

Figure 2:
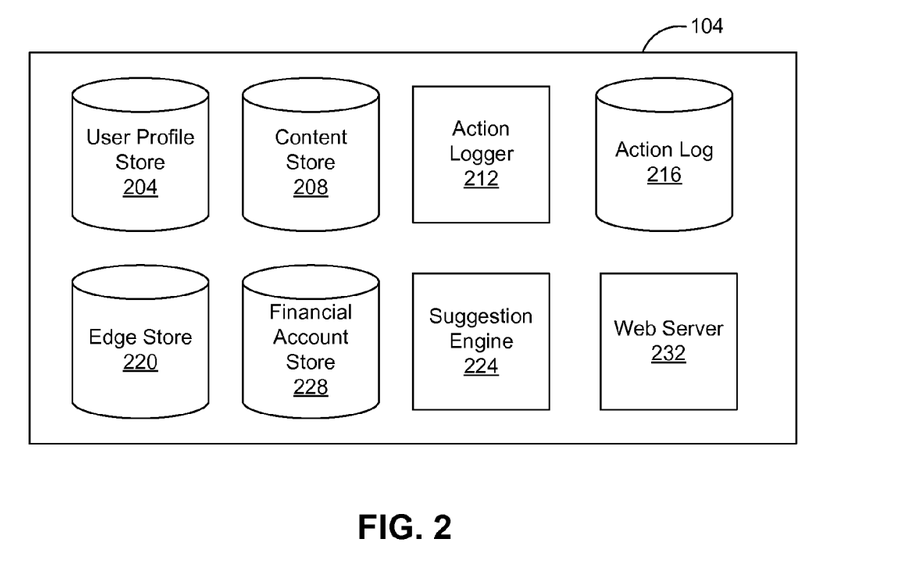
FIG. 2 is a block diagram of a system architecture for a social networking system, in accordance with an embodiment of the invention.

FIG. 2 is a block diagram of a system architecture of the social networking system 104. The social networking system 104 shown by FIG. 2 includes a user profile store 204, a content store 208, an edge store 220, an action logger 212, an action log 216, a suggestion engine 224, a financial account store 220 and a web server 232. In other embodiments, the social networking system 104 may include additional, fewer, or different modules for various applications. Conventional components such as network interfaces, security mechanisms, load balancers, failover servers, management and network operations consoles, and the like are not shown so as to not obscure the details of the system architecture.

Each user of the social networking system 104 is associated with a user profile, which is stored in the user profile store 204. A user profile includes declarative information about the user that was explicitly shared by the user, and may also include profile information inferred by the social networking system 104. In one embodiment, a user profile includes multiple data fields, each data field describing one or more attributes of the corresponding user of the social networking system 104. The user profile information stored in user profile store 204 describes the users of the social networking system 104, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 104 displayed in an image. A user profile in the user profile store 204 may also maintain references to actions by the corresponding user performed on content items in the content store 208 and stored in the edge store 220.

As further described below, a user profile may be associated with one or more financial accounts, allowing the user profile to include data retrieved from or derived from a financial account. A user may specify one or more privacy settings, which are stored in the user profile, that limit information from a financial account that the social networking system 104 is permitted to access. For example, a privacy setting limits the social networking system 104 to accessing the transaction history of the financial account and not the current account balance. As another example, a privacy setting limits the social networking system 104 to a subset of the transaction history of the financial account, allowing the social networking system 104 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 104. In one embodiment, information from the financial account is stored in the user profile store 204. In other embodiments, it may be stored in the financial account store 228, which is further described below.

The content store 208 stores content items associated with a user profile, such as images, videos or audio files. Content items from the content store 208 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 104. Examples of social networking content items include suggested connections or suggestions to perform other actions, media provided to, or maintained by, the social networking system 104 (e.g., pictures or videos), status messages or links posted by users to the social networking system, events, groups, pages (e.g., representing an organization or commercial entity), and any other content provided by, or accessible via, the social networking system.

The content store 208 also includes one or more pages associated with entities having user profiles in the user profile store 204. An entity is a non-individual user of the social networking system 104, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors associated with vendor systems 112, further described above in conjunction with FIG. 1, may be associated with pages in the content store 208, allowing social networking system users to more easily interact with the vendor via the social networking system 104. A vendor identifier is associated with a vendor's page, allowing the social networking system 104 to identify the vendor and/or to retrieve additional information about the vendor from the user profile store 204, the action log 216 or from any other suitable source using the vendor identifier. In some embodiments, the content store 208 may also store one or more targeting criteria associated with stored objects and identifying one or more characteristics of a user to which the object is eligible to be presented.

The action logger 212 receives communications about user actions on and/or off the social networking system 104, populating the action log 216 with information about user actions. Such actions may include, for example, adding a connection to another user, sending a message to another user, uploading an image, reading a message from another user, viewing content associated with another user, attending an event posted by another user, among others. In some embodiments, the action logger 212 receives, subject to one or more privacy settings, transaction information from a financial account associated with a user and identifies user actions from the transaction information. For example, the action logger 212 retrieves vendor identifiers from the financial account's transaction history and identifies an object, such as a page, in the social networking system associated with the vendor identifier. This allows the action logger 212 to identify a user's purchases of products or services that are associated with a page, or another object, in the content store 208. In addition, a number of actions described in connection with other objects are directed at particular users, so these actions are associated with those users as well. These actions are stored in the action log 216.

The action log 216 may be used by the social networking system 104 to track user actions on the social networking system 104, as well as external website that communicate information to the social networking system 104. Users may interact with various objects on the social networking system 104, including commenting on posts, sharing links, and checking-in to physical locations via a mobile device, accessing content items in a sequence or other interactions. Information describing these actions is stored in the action log 216. Additional examples of interactions with objects on the social networking system 104 included in the action log 216 include commenting on a photo album, communications between users, becoming a fan of a musician, adding an event to a calendar, joining a groups, becoming a fan of a brand page, creating an event, authorizing an application, using an application and engaging in a transaction. Additionally, the action log 216 records a user's interactions with advertisements on the social networking system 104 as well as other applications operating on the social networking system 104. In some embodiments, data from the action log 216 is used to infer interests or preferences of the user, augmenting the interests included in the user profile and allowing a more complete understanding of user preferences.

The action log 216 may also store user actions taken on external websites and/or determined from a financial account associated with the user. For example, an e-commerce website that primarily sells sporting equipment at bargain prices may recognize a user of a social networking system 104 through social plug-ins that enable the e-commerce website to identify the user of the social networking system 104. Because users of the social networking system 104 are uniquely identifiable, e-commerce websites, such as this sporting equipment retailer, may use the information about these users as they visit their websites. The action log 216 records data about these users, including webpage viewing histories, advertisements that were engaged, purchases made, and other patterns from shopping and buying. Actions identified by the action logger 212 from the transaction history of a financial account associated with the user allow the action log 216 to record further information about additional types of user actions.

In one embodiment, an edge store 220 stores the information describing connections between users and other objects on the social networking system 104 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 104, such as expressing interest in a page on the social networking system, sharing a link with other users of the social networking system, and commenting on posts made by other users of the social networking system. The edge store 220 stores edge objects that include information about the edge, such as affinity scores for objects, interests, and other users. Affinity scores may be computed by the social networking system 104 over time to approximate a user's affinity for an object, interest, and other users in the social networking system 104 based on the actions performed by the user. Multiple interactions between a user and a specific object may be stored in one edge object in the edge store 220, in one embodiment. In some embodiments, connections between users may be stored in the user profile store 204, or the user profile store 204 may access the edge store 220 to determine connections between users.

In one embodiment, the financial account store 228 includes financial account identifiers associated with user profiles and an association between a financial account and its corresponding user profile. A user may include additional information about the financial account in the financial account store, such as the name of a financial account provider 116, a description of the financial account and may also include authentication information for accessing the account such as names, passwords or other security credentials. In embodiments where information about user financial accounts are stored in the financial account store 228, the social networking system 104 may apply additional security measures to the financial account store 228 to reduce the risk of unauthorized access to financial account information. Alternatively, financial account information may be included in the user profile store 204 as data in a user's user profile. One or more privacy settings may be applied to the financial account information to limit its accessibility to objects in the social networking system 104.

To encourage association of financial accounts with user profiles, the social networking system 104 may compensate a user for associating a financial account with a user profile. In one embodiment, after a user associates a financial account with a user profile, the social networking system 104 allows the user to select a vendor and credits the user's financial account by a credit amount to be applied to a subsequent purchase from the selected vendor. For example, after associating a credit card account with a user profile, the social networking system 104 allows a user to select from a group of vendors and credits the financial account by a credit amount applied to a purchase from the selected vendor. Hence, the credit amount is applied to the user's subsequent purchase from a selected shoe retailer but not to a subsequent purchase from a non-selected cookware vendor.

After associating a financial account with a user profile, the social networking system 104 identifies vendors with which the user is likely to have an interest and presents these vendors to the user. This allows a user to identify a vendor for which the credit amount is applied as a vendor from which the user is likely to make a purchase. To simplify user identification of a vendor, the suggestion engine 224 accesses data in the user profile store 204, the content store 208 and/or the financial account store 228 and identifies one or more candidate pages from the content store 208 associated with vendors in which a user is likely to have an interest. Because the selection engine 224 identifies candidate pages after a user associates a financial account with the user profile, the suggestion engine 224 may use information from the transaction history of the financial account to more accurately identify vendors, and their corresponding pages, from which the user makes purchases.

The suggestion engine 224 may use any suitable process and/or processes for identifying vendors and their corresponding pages. As examples, the suggestion engine 224 accesses the transaction history associated with the financial account and identifies vendors associated with a threshold number of transactions, vendors associated with a highest number of transactions, vendors associated with transactions having at least a threshold transaction amount, vendors associated with transactions having the highest transaction amounts, vendors associated with transactions having a combined transaction amount of at least a threshold value, vendors associated with transactions having the highest combined transaction amounts or associated with any other. The suggestion engine 224 may retrieve a portion of the transaction history for a particular time frame and identify vendors from transactions in the portion of the transaction history. As another example, the suggestion engine 224 identifies user spending patterns by analyzing the user's transaction history and identifying vendors based on the spending patterns. Vendor identifiers for vendors identified from the transaction history are determined and used to retrieve pages from the content store 208 associated with the vendor identifiers Additionally, the suggestion engine 224 may identify vendors from the transaction history as described above and identify additional vendors by comparing information associated with the pages associated with the identified vendors with information associated with additional pages. This can be used to provide a user with additional vendors similar to vendors in the user's transaction history. For example, keywords associated with pages associated with vendors identified from the transaction history are compared to keywords associated with pages associated with additional vendors to identify one or more of the additional pages having keywords similar to or matching those associated with vendors identified from the transaction history as candidate pages. This allows the suggestion engine 224 to present the user with a more diverse selection of vendors based on information maintained by the social networking system 104 about vendors. Other methods of identifying additional vendors may also be applied.

The suggestion engine 224 may use information in the user profile store 204 and/or in the action log 216, either individually or in combination with the transaction history, to select candidate pages associated with vendors to present to a user. In one embodiment, the suggestion engine 224 identifies candidate pages comparing interests from a user profile to keywords associated with a vendor's page in the content store 208 and identifies candidate pages having keywords matching or similar to the interests. In one embodiment, the suggestion engine 224 identifies vendor identifiers from the financial account transaction history, as described above, then accesses the content store 208 to obtain additional information associated with vendors corresponding to the vendor identifiers. The additional information about the identified vendors is compared to user profile information for the user associating the financial account with the user profile and the suggestion engine 224 selects vendors associated with information similar to, or matching, the user profile information. For example, if a user profile indicates a user has basketball as an interest, the suggestion engine 224 selects one or more candidate pages associated with vendors identified by the transaction history and associated with information in the content store 208 indicating they provide basketball-related products or services.

Actions between the user and pages maintained by the social networking system stored in the action log 216 may be used by the suggestion engine 224 to select candidate pages. In one embodiment, the suggestion engine 224 analyzes actions involving the user and various pages in the content store 208 as well as connections between the user and various pages in the edge store 220 to select candidate pages. For example, the suggestion engine 224 selects candidate pages based on the frequency of actions between the user and a page, the number of interactions between the user and the page, the type of connection between the user and a page, a type of action between the user and a page or any other suitable criteria.

Additional information in a user profile or associated with a user profile may also be used to identify candidate pages. For example, the suggestion engine 224 identifies dates associated with a user profile and identifies transactions from the transaction history occurring within a specified time range from the identified dates. Examples of dates associated with the user profile include the user's birthday, the user's anniversary, birthdays of users connected to the user, anniversaries of other users connected to the user, holidays or other dates associated with the user or with users connected to the user. Based on the transaction history from the financial account, the suggestion engine 224 may retrieve vendor identifiers associated with previous transactions by the user associated with a date and select candidate pages associated with the retrieved vendor identifiers. For example, if the transaction history indicates that the user has made purchases at a jewelry store prior to earlier birthdays of another user connected to the user and the current date is within a threshold interval of the birthday, the suggestion engine 224 selects candidate pages associated with jewelry vendors when. Hence, the suggestion engine 224 may account for the timing of prior transactions when selecting candidate pages to increase the likelihood that the credit amount provided to a user for associating a financial account with a user account is applied to a vendor from which the user is likely to make a purchase.

The web server 232 links the social networking system 104 via the network 140 to the client device 108, to the financial account provider 116 and/or to the vendor system 112. The web server 232 serves web pages, as well as other web-related content, such as JAVA®, FLASH®, XML and so forth. The web server 232 may provide the functionality of receiving and routing messages between the social networking system 104 and the client device 108, for example, instant messages, queued messages (e.g., email), text and SMS (short message service) messages, or messages sent using any other suitable messaging technique. A user may send a request to the web server 232 to upload information, for example, images or videos that are stored in the content store 208. Additionally, the web server 232 may provide application programming interface (API) functionality to send data directly to native client device operating systems, such as iOS®, ANDROID™, webOS® or RIM. The web server 232 also provides API functionality for exchanging data, such as financial account information, between the social networking system 104 and the financial account provider 116.

Providing Vendor Recommendations to a User

Figure 3:
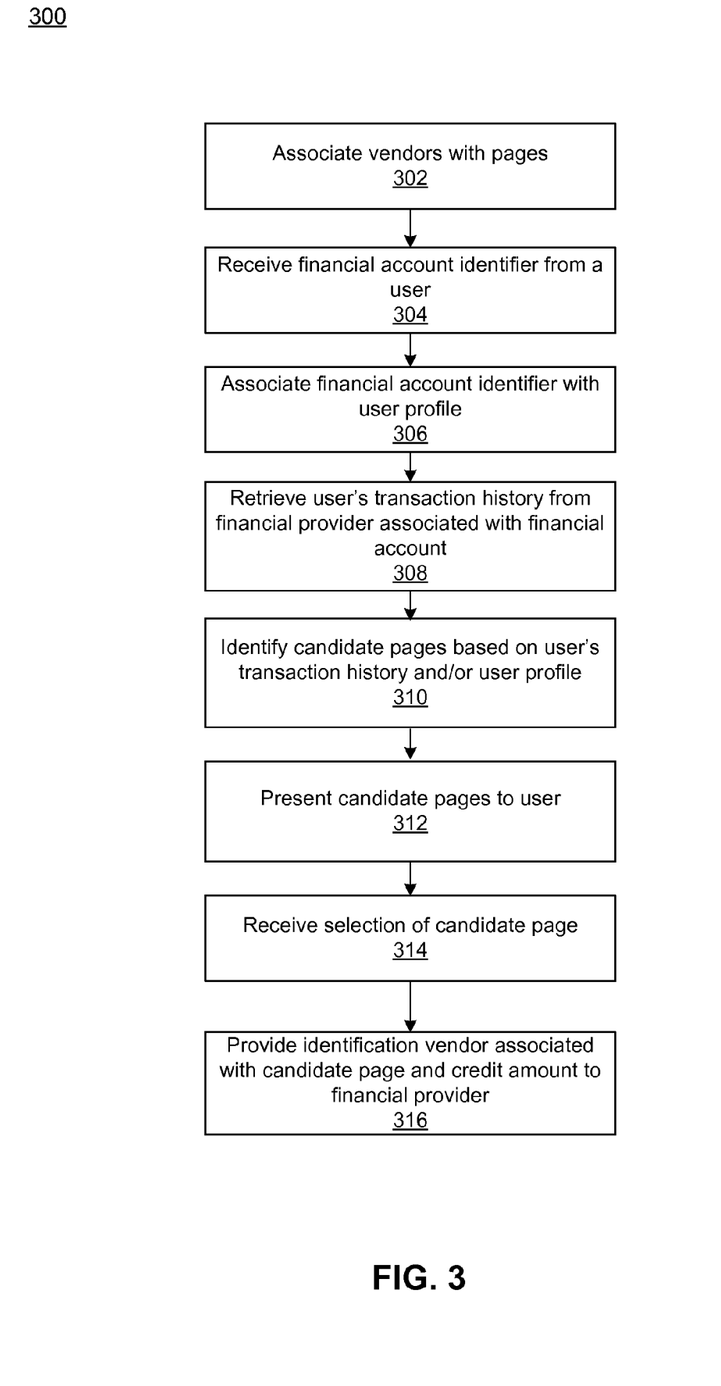
FIG. 3 is a flow chart of a method for compensating a user for linking a financial account to a user account in a social networking system, in accordance with an embodiment of the invention.

FIG. 3 illustrates one embodiment of a method 300 for compensating a user for associating a financial account with a user profile in a social networking system 104. Vendors create pages in the social networking system 104 describing the vendor. For example, a page describes products provided by the vendor, describes information about the vendor, presents content from other users associated with the vendor or other suitable information associated with the vendor. A page created with a vendor is associated 302 with a vendor identifier uniquely identifying the vendor. In one embodiment, the social networking system 104 stores a table in the content store 208 associating 302 vendor identifiers with page identifiers, allowing the social networking system 104 to rapidly identify pages associated with vendors. In other embodiments, any suitable method for associating pages with vendor identifiers may be used.

User profiles associated with various users are also maintained by the social networking system 104, allowing a user to associate a financial account with the user user's profile. The social networking system receives 304 a financial account identifier, such as an account number, from a user to associate with the user's user profile. In one embodiment, the social networking system 104 prompts the user for the financial account identifier using a message, recommendation unit or other suitable notification mechanism and receives 304 the financial account identifier in response to the user interacting with the notification. Alternatively, the user accesses its user profile and enters the financial account identifier into the user profile. The financial account identifier may be stored in the user profile store 204 or in the financial account store 228.

The user also associates one or more privacy settings with the financial account identifier received 304 by the social networking system 104. The privacy settings limit the information that the social networking system 104 may retrieve from the corresponding financial account. Additionally, the social networking system 104 may apply additional security protocols to protect the financial account identifier.

In some embodiments, the social networking system 104 receives 304 security credentials as well as the financial account identifier from the user. Examples of security credentials include a login and password, a response to a security question or any other suitable security credentials allowing the social networking system 104 to retrieve information from a financial account provider 116. As described above, one or more privacy settings may be specified by the user to limit the information that the social networking system 104 may retrieve from the financial account provider 116. For example, the social networking system 104 may be limited to receiving certain portions of a transaction history associated with the identified financial account, such as transactions within a specified time interval, transactions that do not involve specified vendors or transactions involving specified vendors.

The social networking system 104 associates 306 financial account received 304 from the user with the user's user profile in the in the user profile store 208. For example, the financial account identifier is included in the user profile, with additional security protocols applied to the financial account identifier by the social networking system 104. As another example, the financial account identifier is stored in the financial account store 228 and a link or to the financial account store 228 is stored in the user profile to enable retrieval of the financial account identifier.

Using the stored financial account identifier as well as security credentials the social networking system 104 retrieves 308 the transaction history from the identified financial account from the financial account provider 116 subject to any privacy settings provided by the user. For example, the web server 232 of the social networking system transmits a request to the financial account provider 116 including the financial account identifier and one or more security credentials. The request may be transmitted using an application programming interface used by the financial account provider 116. In one embodiment, the social networking system 104 retrieves 308 the transaction history and stores the transaction history in the financial account store 228. The transaction history may temporarily store the transaction history for analysis and remove the transaction history after completing the analysis. Alternatively, the transaction history is analyzed while stored by the financial account provider 116 with the results of the analysis received 308 by the social networking system 104.

Based on the transaction history and/or the user profile, the suggestion engine 224 identifies 310 candidate pages from the content store 208. For example, the suggestion engine 224 identifies 320 candidate pages based on vendor identifiers from the transaction history and identifying pages in the content store 208 associated with the vendor identifiers. Vendor identifiers associated with transactions having at least a threshold transaction amount, associated with at least a threshold number of transactions in the transaction history, associated with transactions in the transaction history within a specified time of a date or based on other factors described above in conjunction with FIG. 2. Information from the user profile, such as interests or connections to other users or objects, may be used by the suggestion engine 224 to identify 310 candidate pages as described above in conjunction with FIG. 2. Using information from the user profile allows the suggestion engine 224 to more accurately identify 310 candidate pages based on information about the user.

The identified candidate pages are presented 312 to the user by the social networking system 104. For example, the candidate pages are presented 312 using a display including the candidate pages or presented 312 in a story in a newsfeed presented to the user. As additional examples, the candidate pages may be presented 312 using one or more suggestions, or recommendation units, shown to the user or presented 312 in a message or other notification sent to the user. The candidate pages may alternatively be presented 312 using other notification mechanisms, such as an email sent by the social networking system 104 to the user, a text message sent to the user or other communication channels.

The social networking system 104 receives 314 a selection of a candidate page from the user by any suitable input mechanism. Based on the selection, the social networking system 104 identifies the vendor associated with the selected candidate page. The vendor identifier associated with the selected candidate page is identified and the social networking system 104 provides 316 the vendor identifier and a credit amount to the financial account provider 116. The credit amount specifies an amount of compensation the user received for associating the financial account with the user profile. In various embodiments, the credit amount is provided to the financial account provider 116 by the social networking system 104 and/or by the vendor system 112. Alternatively, the credit amount is provided by the social networking system 104 to the vendor associated with the selected candidate page, allowing the vendor to apply the credit amount to one or more purchases made by the user. In some embodiments the credit amount is applied to one or more purchases by the user from the vendor associated with the selected candidate page (or from another vendor partnered or associated with the vendor associated with the selected candidate page) and not to purchases made from other vendors. Alternatively, the credit amount is applied to one or more purchases by the user from any vendor. The credit amount can either be a predetermined amount or can be a variable amount that is determined at the time of the transaction. Factors influencing the credit amount include, but are not limited to, a loyalty status of the user, current vendor promotions (seasonal, product specific, etc.), the price of the product purchased, or other incentives.

Figure 4:
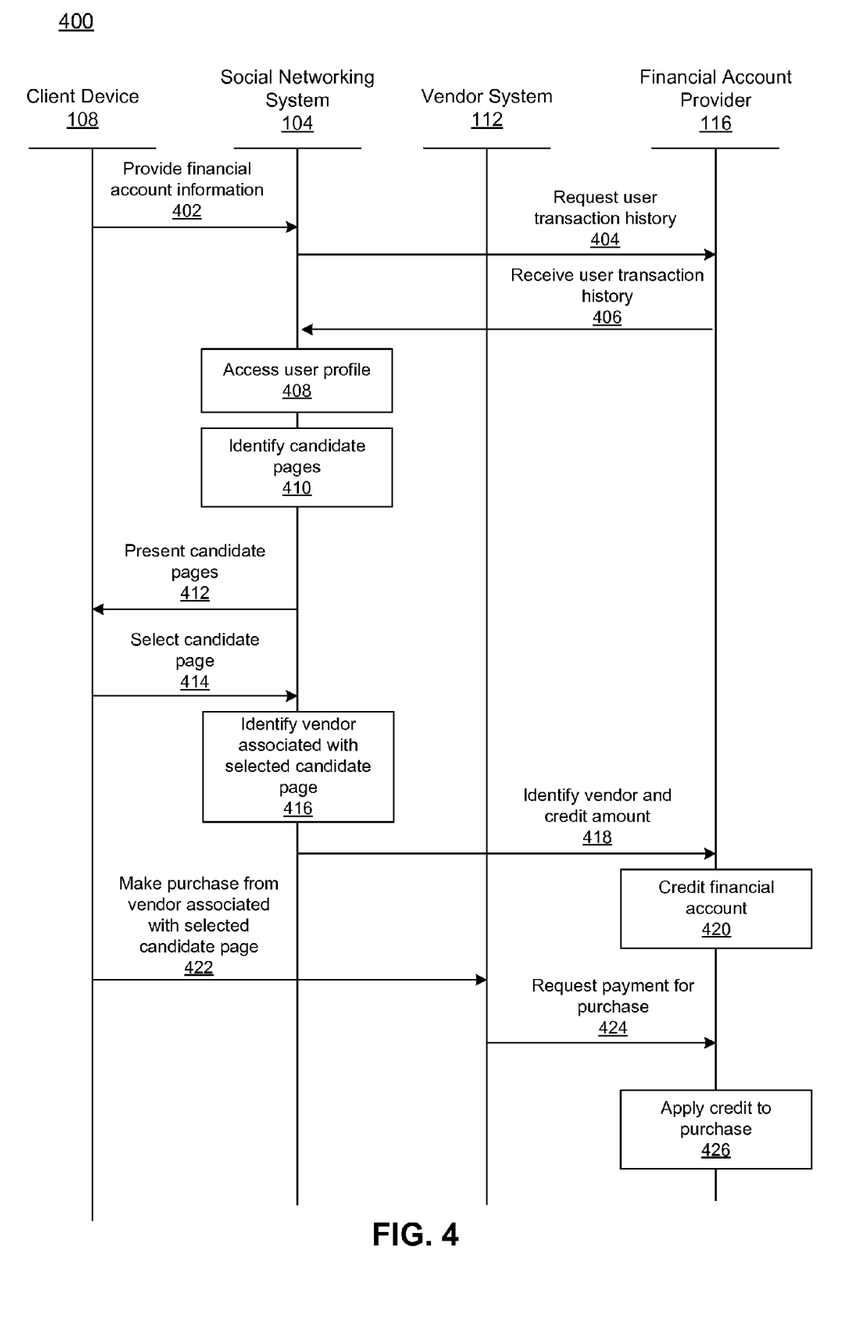
FIG. 4 is an interaction diagram of compensating a user for linking a financial account to a user account in a social networking system, in accordance with an embodiment of the invention.

FIG. 4 is an interaction diagram of a method 400 for compensating a user for linking a financial account to a user account in a social networking system 104. In the embodiment shown by FIG. 4, a user provides 402 a financial account identifier to the social networking system 104, which includes a user profile associated with the user, via a network 140. As described above, the user may also provide 402 security credentials via a client device 108 to allow the social networking system 104 to access the identified financial account and/or privacy settings to limit the information from the financial account accessible to the social networking system 104. Using the financial account identifier, the social networking system 104 requests 404 a transaction history of the financial account from the financial account provider 116. In one embodiment, the social networking system 104 uses an application programming interface (API) call to request 404 the transaction history form the financial account provider 116.

The social networking system 104 receives 406 the transaction history or data derived from the transaction history from the financial account provider 116. In one embodiment, the social networking system 104 accesses 408 the user profile of the user providing the financial account identifier and identifies 410 candidate pages maintained by the social networking system 104 based on the user profile and the transaction history. As described above in conjunction with FIGS. 2 and 3, the social networking system 104 may use information in the user profile and in the transaction history to identify 410 one or more candidate pages. In some embodiments, the candidate pages are identified 410 from the transaction history as described above.

One or more of the identified candidate pages are presented 412 to the user by the social networking system 104. For example, the social networking system 104 transmits the one or more candidate pages to the client device 108 for presentation. Via the client device 108, the user selects 108 a candidate page and the selection is communicated to the social networking system 104 via the network 140. The social networking system 104 identifies 416 the vendor associated with the selected candidate page and identifies 418 the vendor to the financial account provider 116. For example, the social networking system 104 identifies 416 a vendor identifier associated with the selected candidate page and identifies 418 the vendor identifier and a credit amount to the financial account provider 116. The credit amount is applied 420 to the financial account by the financial account provider 116. As described above in conjunction with FIG. 3, the compensation used for the credit amount may be provided by the identified vendor, by the social networking system 104 or by any other suitable entity. Alternatively, the social networking system 104 may identify a credit amount to the identified vendor, allowing the identified vendor to apply the credit amount to a subsequent purchase from the identified vendor by the user.

The user may purchase 422 a product or service from the vendor associated with the selected candidate page. For example, the user may purchase 422 a product or service from a website, which is associated with a vendor system 112 associated with the selected candidate page, by identifying the financial account via the client device 108. As another example, the user purchases 422 a product or service from a physical retail location associated with the vendor associated with the selected candidate page using a credit card, debit card or other instrument associated with the identified financial account. The vendor system 112 requests 424 payment for the user's purchase from the financial account provider 116 identifying then vendor and the financial account, and the financial account provider 116 applies 426 the credit to the purchase. In one embodiment, the financial account provider 116 compares the vendor identified by the request for purchase to the vendor identified 418 by the social networking system 104 and applies 416 the credit amount to the purchase if the vendor identifiers match.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving an account identifier for a financial account of a user of a social networking system, the financial account maintained by a financial account provider;
   associating the financial account identifier with a user profile for the user maintained by the social networking system;
   retrieving a transaction history for the user from the financial account provider using the received account identifier;
   identifying one or more candidate pages, each candidate page corresponding to a user page in the social networking system representing a commercial entity, the identifying based on at least one of the retrieved transaction history for the user and the user profile;
   presenting the one or more candidate pages to the user;
   receiving a selection of a candidate page associated with a selected vendor; and
   providing an identifier associated with the selected vendor and a credit amount to the financial account provider, the credit amount specifying an amount added to the financial account of the user.

2. The method of claim 1, wherein the amount added to the financial account of the user is provided by the social networking system.

3. The method of claim 1, further comprising:
notifying the selected vendor of the selection of the candidate page.

4. The method of claim 1, wherein identifying one or more candidate pages:
identifying purchases by the user and vendors associated with the purchases from the retrieved transaction history;
identifying one or more vendors associated with at least a threshold number of purchases by the user; and
identifying candidate pages associated with the identified one or more vendors.

5. The method of claim 1, wherein identifying one or more candidate pages comprises:
identifying vendors associated with purchases made by the user from the retrieved transaction history, each purchase having a purchase amount;
determining a total purchase amount associated with each vendor from the purchase amounts; and
identifying one or more candidate pages associated with vendors associated with a total purchase amount equaling or exceeding a threshold purchase amount.

6. The method of claim 1, wherein identifying one or more candidate pages comprises:
selecting candidate pages based on one or more characteristics of interactions between the user and pages maintained by the social networking system identified by the user profile.

7. The method of claim 6, wherein the one or more characteristics comprise at least one of: a type, a number and a frequency.

8. The method of claim 1, wherein identifying one or more candidate pages comprises:
determining one or more interests of the user from the user profile;
determining one or more keywords associated with pages maintained by the social networking system; and
selecting one or more candidate pages associated with keywords that are associated with one or more of the interests of the user.

9. The method of claim 1, wherein associating the financial account identifier with the user profile comprises:
requesting a confirmation from the user to associate the financial account identifier with the user profile; and
responsive to receiving the confirmation from the user, associating the financial account identifier with the user profile.

10. The method of claim 1, wherein retrieving the transaction history comprises:
requesting approval from the user to retrieve the transaction history; and
responsive to receiving approval from the user, retrieving the transaction history.

11. The method of claim 10, wherein retrieving the transaction history comprises:
receiving approval to retrieve a subset of the transaction history; and
retrieving the subset of the transaction history.

12. A method comprising:
associating one or more vendors with one or more pages maintained by a social networking system;
receiving an account identifier for a financial account of a user of a social networking system, the financial account maintained by a financial account provider;
associating the financial account identifier with a user profile of the user, the user profile maintained by the social networking system;
retrieving a transaction history associated with the financial account corresponding to the received account identifier from the financial account provider;
identifying one or more candidate pages from the pages, each candidate page corresponding to a user page in the social networking system representing a commercial entity, the identifying based on at least one of the retrieved transaction history for the user and the user profile;
presenting the one or more candidate pages to the user;
receiving a selection of a candidate page associated with a selected vendor; and
providing a credit amount to the selected vendor, the credit amount specifying an amount applied to a purchase from the selected vendor by the user.

13. The method of claim 12, wherein identifying one or more candidate pages from the pages comprises:
identifying purchases by the user and vendors associated with the purchases from the retrieved transaction history;
identifying one or more vendors associated with at least a threshold number of purchases by the user; and
identifying candidate pages associated with the identified one or more vendors.

14. The method of claim 12, wherein identifying one or more candidate pages comprises:
identifying vendors associated with purchases made by the user from the retrieved transaction history, each purchase having a purchase amount;
determining a total purchase amount associated with each vendor from the purchase amounts; and
identifying one or more candidate pages associated with vendors associated with a total purchase amount equaling or exceeding a threshold purchase amount.

15. The method of claim 12, wherein identifying one or more candidate pages comprises:
selecting candidate pages based on one or more characteristics of interactions between the user and pages maintained by the social networking system identified by the user profile.

16. The method of claim 15, wherein the one or more characteristics comprise at least one of: a type, a number and a frequency.

17. The method of claim 12, wherein identifying one or more candidate pages comprises:
determining one or more interests of the user from the user profile;
determining one or more keywords associated with pages maintained by the social networking system; and
selecting one or more candidate pages associated with keywords that are associated with one or more of the interests of the user.

18. The method of claim 12, wherein retrieving the transaction history comprises:
requesting approval from the user to retrieve the transaction history; and
responsive to receiving approval from the user, retrieving the transaction history.

19. The method of claim 18, wherein retrieving the transaction history comprises:
receiving approval to retrieve a subset of the transaction history; and
retrieving the subset of the transaction history.

20. A method comprising:
receiving a financial account identifier from a social networking system corresponding to a financial account of a social networking system user;

responsive to an authorization from the user allowing the social networking system to access a transaction history of the financial account, providing the social networking system with the transaction history of the financial account; and receiving, from the social networking system, a vendor identifier and a credit amount for application to a transaction with a vendor associated with the vendor identifier using the financial account of the social networking system user, the vendor being a commercial entity that is associated with a user page in the social networking system representing the vendor.

21. The method of claim 20, further comprising:

receiving a request from the transaction from the vendor associated with the vendor amount, the request specifying a transaction amount; and applying the credit amount to the transaction amount.

22. The method of claim 1, further comprising applying the credit amount added to the financial account of the user to a purchase made from the selected vendor.

* * * * *

UNITED STATES PATENT AND TRADEMARK OFFICE
CERTIFICATE OF CORRECTION

PATENT NO. : 9,959,546 B2
APPLICATION NO. : 13/747649
DATED : May 1, 2018
INVENTOR(S) : Loren Alfred Cheng et al.

Page 1 of 1

It is certified that error appears in the above-identified patent and that said Letters Patent is hereby corrected as shown below:

In the Claims

Column 15, Line 5, after "candidate pages," insert -- comprises: --.

Signed and Sealed this
Sixth Day of November, 2018

Andrei Iancu
*Director of the United States Patent and Trademark Office*